United States Patent [19]

Pula

[11] Patent Number: 5,208,848
[45] Date of Patent: May 4, 1993

[54] TELECOMMUNICATIONS CALL PROCESSING

[75] Inventor: Michael K. Pula, Naperville, Ill.

[73] Assignee: AT&T Bell Laboratories, Murray Hill, N.J.

[21] Appl. No.: 750,138

[22] Filed: Aug. 26, 1991

[51] Int. Cl.⁵ .................... H04M 1/64; H04M 11/100
[52] U.S. Cl. ........................................ 379/67; 379/88; 379/89; 379/97
[58] Field of Search .................... 379/88, 89, 97, 67

[56] References Cited

U.S. PATENT DOCUMENTS

| | | | |
|---|---|---|---|
| 4,825,460 | 4/1989 | Carter et al. | 379/67 |
| 4,852,149 | 7/1989 | Zwick et al. | 379/67 |
| 4,998,291 | 3/1991 | Marui et al. | 455/89 |

FOREIGN PATENT DOCUMENTS 0105441 4/1984 European Pat. Off. .

OTHER PUBLICATIONS

S. D. Hester et al., "The AT&T Multi-Mode Voice Systems–Full Spectrum Solutions For Speech Processing Aplications", *Proceedings of the 1985 AVIOS Conference*, Sep. 1985, pp. 1-10.

W. Ulrich et al., "Translations In The No. 1 Electronic Switching System", *The Bell System Technical Journal*, vol. XLIII, No. 5, Part 2, Sep. 1964, pp. 2533-2573.

*Primary Examiner*—James L. Dwyer
*Assistant Examiner*—Fan Tsang
*Attorney, Agent, or Firm*—Werner Ulrich

[57] ABSTRACT

This invention relates to a method and apparatus for establishing telecommunications calls. An intelligent peripheral is bridged to a call being dialed. If the intelligent peripheral recognizes a need to supply information for establishing a call, or for signaling a customer request, the intelligent peripheral supplies digits or characters on the customer's behalf for use by the switch. The peripheral optionally has speech recognition apparatus for interpreting customer requests and supplying the digits needed to implement that request.

25 Claims, 3 Drawing Sheets

TELECOMMUNICATIONS CALL PROCESSING

TECHNICAL FIELD

This invention relates to a method and apparatus for deriving information for establishing telecommunications calls.

PROBLEM

Modern digital switches, such as the 5ESS ® switch manufactured by AT&T, and described, for example, in the *AT&T Technical Journal*, vol. 64, no. 6, July/August 1985, pages 1303-1564, have substantial flexibility for offering a large class of services. However, there is a class of services which, in general, require substantial amounts of data for the customers using these services which, because of the structure of the software for controlling the switch, can only be implemented at great expense. The software structure of the 5ESS switch and other similar modern digital switches normally keeps all data associated with an active customer in the dynamic memory used for serving a call. Therefore, such services as require a large amount of memory cause a large amount of dynamic memory to be used whenever a customer having the service originates a call.

Another class of services which cannot be processed economically by a 5ESS switch are services in which a customer's speech is recognized and interpreted in parallel with a detection and interpretation of customer dialed digits, since processors are typically dedicated to performing either digit detection or speech recognition. As one example, a telephone provided for a customer who may have physical impairments would allow emergency requests such as fire, police, or ambulance services, to be detected in parallel with the detection of normal digits as dialed by a companion of the impaired individual. Clearly, the repertory of conventionally dialed digits is very much larger than the repertory of emergency services.

Speech recognition systems for use in telephone switching systems are known in the prior art. Such speech recognition systems, for example, allow a person to speak a number or to speak key words such as an emergency command and to have this emergency command or spoken number converted into a telephone number for the setting up the call. Such systems are limited because the recognized speech is converted into telephone numbers in a standardized way.

Another example would be a service to allow a customer to activate or change any of the customer's business or residential features (e.g., call forwarding service) from a remote telephone. Normally, customers can only change the call forwarding number from their own telephone because of the possibility of pranksters diverting calls from the customer by activating a call forwarding number and perhaps forwarding the calls to themselves. What is needed for such a service is an arrangement whereby a careful screening including, for example, a personal identification number is used in conjunction with a dialogue between a switch and the remote customer to verify the identity of the remote customer.

Another example would be a service to record the numbers of unanswered calls and to automatically supply one of these numbers to a switching system to establish a call to that number in response to a spoken command.

Accordingly, a problem of the prior art is that there is no flexible arrangement for recognizing speech and customer dialed information for conversion into customized dialing requests.

SOLUTION

The above problem is solved and an advance is made over the prior art in accordance with the principles of my invention wherein a customer is connected in parallel to a dialing receiver and to an intelligent peripheral system, the intelligent peripheral system comprising data storage, digit reception and transmission facilities, and, optionally, speech recognition facilities. The intelligent peripheral normally simply monitors the voice path to the customer, and if supplied with speech recognition equipment, also checks to detect if any special speech requests have been made. In a departure from the prior art, when a critical condition is detected, the intelligent peripheral sends a seizure signal to the switch in response to which the switch connects digit reception means to the intelligent peripheral and thereafter substitutes digits received from the intelligent peripheral for digits that might have been received from the customer. Advantageously, such an arrangement permits the digit interpretation program of the switch to be used to implement the services provided through the use of the intelligent peripheral. These services are performed on behalf of the customer by the IP.

In accordance with one specific implementation, the intelligent peripheral signals to the switch via a seizure signal such as a $\overline{\text{WINK}}$ signal (i.e., an inverse wink) for an analog trunk connecting the intelligent peripheral to the switch or the equivalent common channel signaling signal for the case of an intelligent peripheral connected via a common channel signaling trunk. The digits are transmitted from the intelligent peripheral using either dual tone multifrequency (DTMF) signaling for an analog trunk or the normal digit signaling facilities of a common channel signaling trunk. The digits, as received, are processed as if these digits had been received from the calling customer.

In accordance with an alternative implementation of applicant's invention, the intelligent peripheral is connected through a basic rate interface or primary rate interface of an integrated services digital network (ISDN) facility. The arrangements for signaling seizures and digits over such a connection are used to transmit the seizure request and the digits provided by the intelligent peripheral.

DETAILED DESCRIPTION

Figure 1:
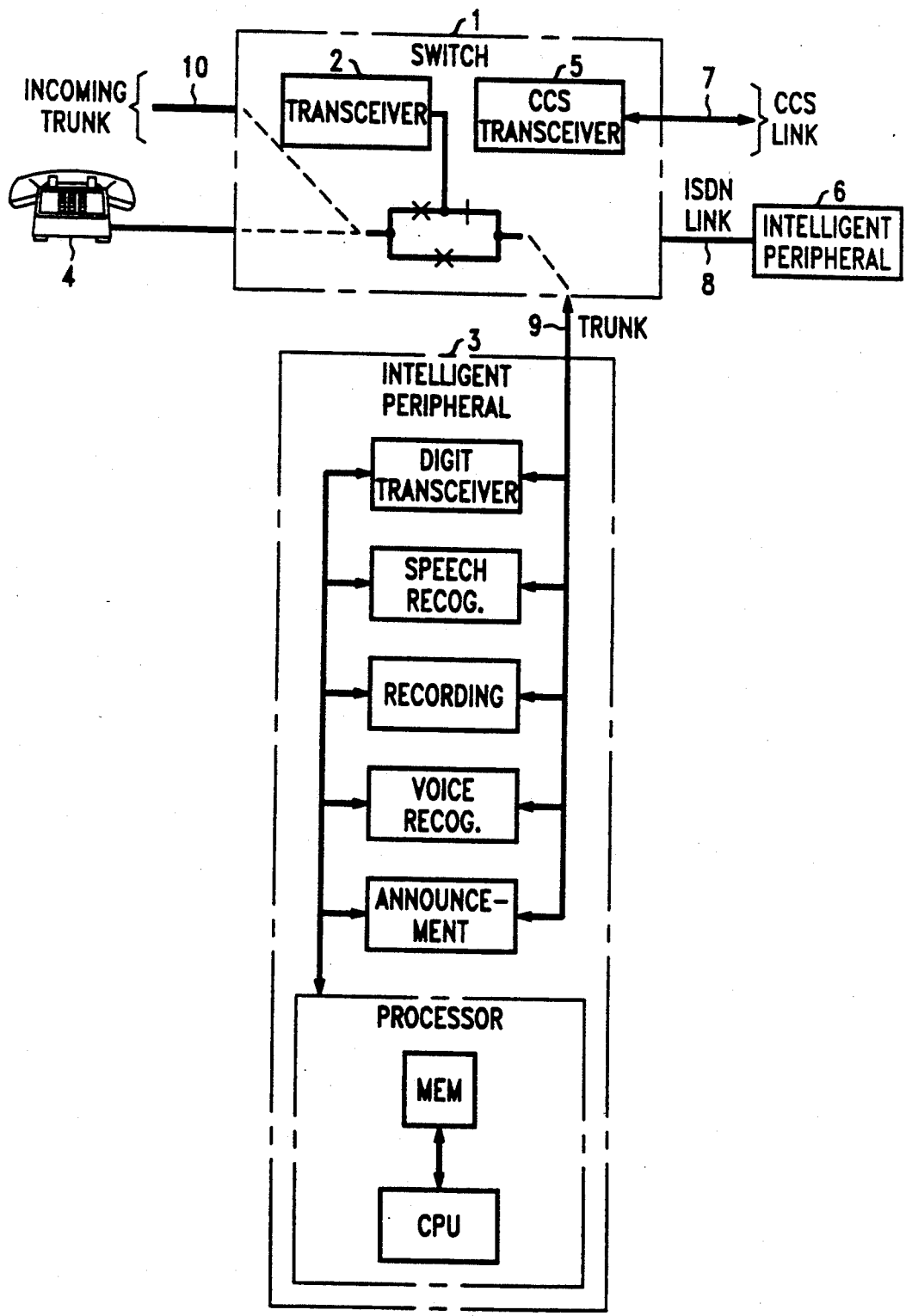
FIG. 1 is a block diagram of a system using the principles of the invention.

FIG. 1 is a block diagram of a system for implementing an exemplary embodiment of this invention. Telephone switching system 1 is connected to a telephone station 4 and to an incoming trunk 10 and an intelligent peripheral (IP) 3 or an IP 6 connected via an integrated services digital network (ISDN) link to the switch. While telephone station 4 is pictured as a DTMF station, it could also be a station having a rotary dial. Inside the switch is a digit transmitter/receiver or transceiver 2. The transceiver means of the 5ESS ® switch can receive dial pulse or DTMF digits and transmit DTMF digits. (For convenience, the act of receiving dial pulse digits and transmitting corresponding DTMF digits will be referred to hereinafter as converting from dial pulse to DTMF digits.) When the customer originally lifts his or her handset, or the switch detects a seizure on incoming trunk 10, the switch connects the customer station or the incoming truck digit transceiver 2. If the customer has a class of service which entitles him or her to the use of the services of an IP, then switch 1 also connects the customer to an IP 3. The connection to the IP is over a truck which can be a simple analog truck. The IP then monitors signals from customer station 4. In this specific embodiment, the signals are a combination of speech signals and dialing signals. In other embodiments, only dialed signals or only speech signals would be used. The speech or dialing signals can be in response to prompting announcements from the IP. Based on the speech and/or dialing signals, the IP recognizes the need for the services of that IP, and the switch ignores digits received by the transceiver. Dial pulse digits received by the transceiver are internally converted and transmitted to the IP as the corresponding DTMF digits. Such transceivers are commonly used in the 5ESS switch and are well known in the prior art, and are a convenient way to provide both the receiver and the transmitter functions. In that case, while DTMF digits corresponding to the customer's dial pulse digits are being transmitted to the IP, a connection from the IP to the customer is reserved, so that the customer can subsequently be connected to the IP to provide additional information thereto. After the IP recognizes that the customer has completed providing speech and dialing signals, the transceiver 2 is disconnected from customer station 4. The IP then transmits digits to transceiver 2 and the switch interprets these digits as if they had been received from station 4. After the switch has recognized that a complete set of digits has been received, the IP disconnects or, after a timeout, is disconnected from the switch and the call is set up from customer 4 in accordance with the received digits. In some cases no call is set up; the string of digits may represent a request such as a request to forward future calls which does not require a connection.

If the IP is connected via a trunk that uses common channel signaling, a connection is initially set up to the IP. Then the digits that the IP generates are transmitted over the voice channel of the trunk. The program of a processor means (not shown) in switch 1 then treats the digits embedded in the common channel signaling message in the same way that it treats digits received over a simple analog trunk in receiver 2.

The IP is the unit which recognizes that it must supply the digits required for executing a requested action by the customer. The IP signals to switch 1 that it has made this determination by sending a seizure signal commonly known as a $\overline{\text{WINK}}$ to switch 1 to alert switch 1 that the IP will supply signaling information to switch 1. In case the trunk is a common channel signaling trunk, the seizure signal is sent as a Common Channel Signaling message but is interpreted in the same way as a $\overline{\text{WINK}}$ signal.

An IP 6 can be connected to switch 1 over an integrated services digital network (ISDN) link using, for example, a basic rate interface (two bearer or B-channels and one data or D-channel) or a primary rate interface (23 B-channels and one D-channel). The ISDN IP 6 receives information from customer station 4 over a B-channel in the same way as IP 3 receives information over trunk 9. However, the ISDN IP 6 can transmit information to switch 1 over a D-channel of ISDN link 8 instead of transmitting digits to a receiver means 2, or can transmit the digits as tones over a B-channel. However, the digits transmitted over the D-channel are interpreted by the control program of switch 1 as if they had been received in receiver means 2 and are treated as if they had been dialed by calling station 4.

Advantageously, the IP is supplied with recording equipment for recording the numbers of callers of unanswered calls, as received via automatic number identification, and, optionally, for recording messages from such callers.

For convenience, the intelligent peripheral is shown as one unit. In practice the memory and processing resources of an intelligent peripheral means are likely to be shared among interfaces for such means for providing speech recognition, (i.e., recognition of spoken elements) recording, voice recognition (i.e., recognition of the identity of the speaker) and announcement services; this is done partly for economy, and partly so that recorded data may be available to any of a plurality of intelligent peripheral means.

While in this illustrative embodiment, the IP signals to the switch using dual tone multifrequency (DTMF) signaling, other modes of signaling such as data messages could also be used, with the results being transmitted to the receiver. The term receiver as used herein refers to the actual digit receiver plus the program and data storage associated therewith to collect digits or characters keyed by a customer or supplied from the intelligent peripheral means.

Figure 2:
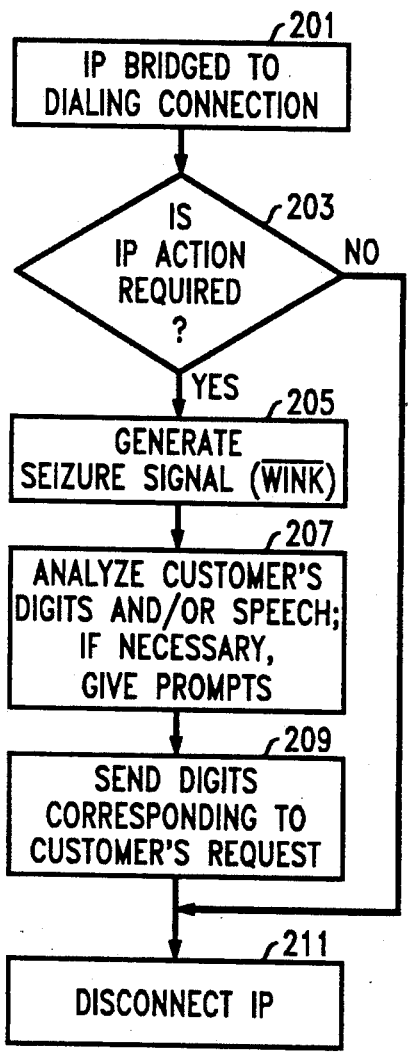
FIG. 2 is a flowchart of actions performed in the intelligent peripheral.

FIG. 2 illustrates actions performed by the IP. Initially, the IP is bridged to the dialing connection from the customer to a digit receiver (action block 201). The IP monitors signals from the originating customer in order to detect if action by the IP is required (test 203). If such action is required, then the IP generates a seizure signal, i.e., $\overline{\text{WINK}}$, (action block 205) for transmission to switch 1. The IP analyzes the customer's digits and/or speech and, if necessary, gives prompts to the customers to elicit needed information. The information from the customer is analyzed and converted into a digit stream for effecting the customer's wishes (action block 207). The digits of that stream are then sent back to switch 1 (action block 209). Thereafter, the IP disconnects (action block 211). If test 203 positively determines that no action is required of the IP, then the IP disconnects and is available to serve another call.

Figure 3:
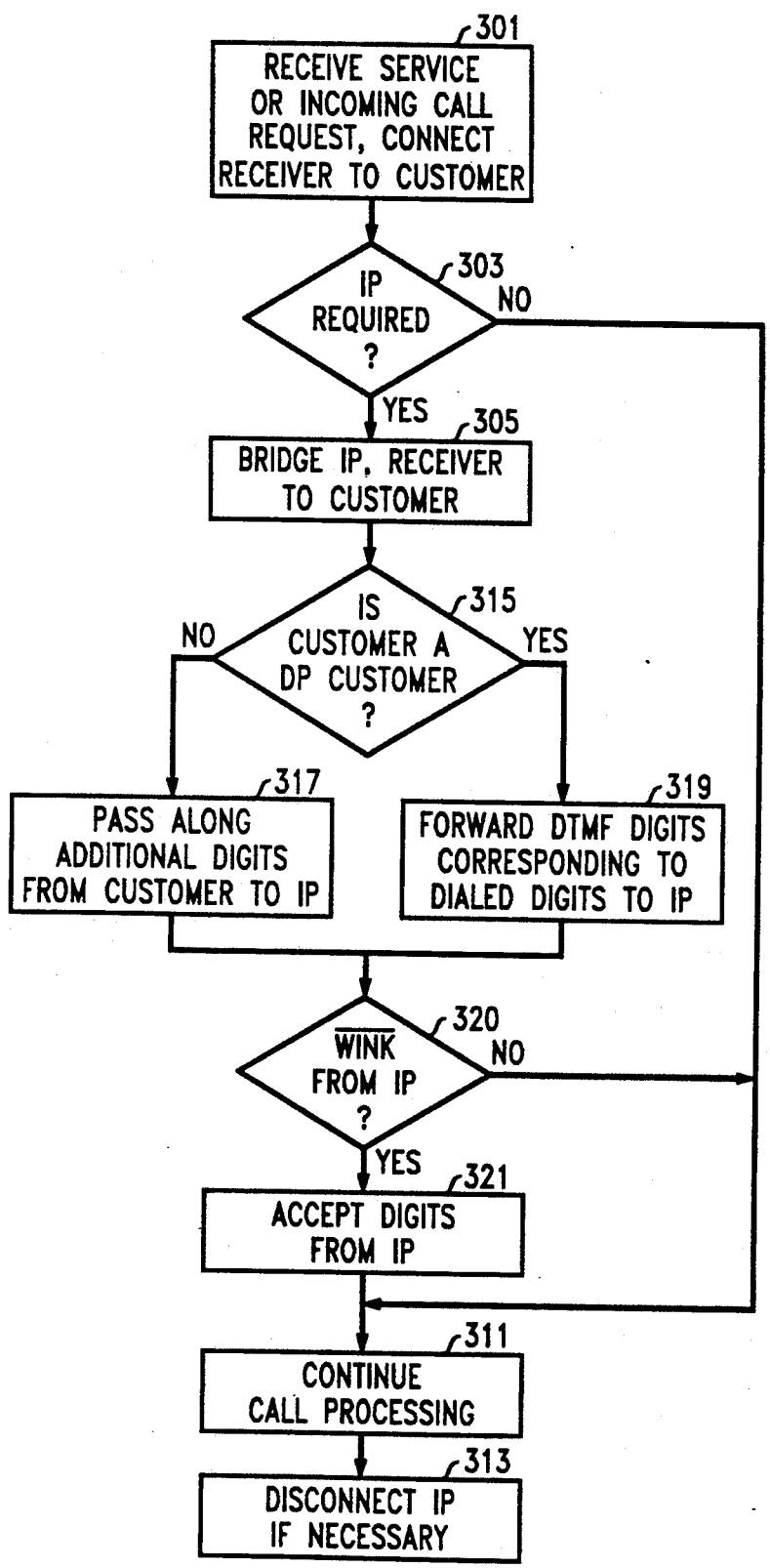
FIG. 3 is a flow diagram of actions performed in the switch.

FIG. 3 is a flow diagram illustrating actions performed in support of the IP by the switch. These actions are performed under the control of processor means in the switch (not shown), the processor means operative under the control of a program stored in memory of the processor means. Initially, the switch receives a service request and the customer is connected to a digit receiver (action block 301). The switch determines, using translation information for the customer who has made the service request, whether that customer may require the use of an IP (test 303). If so, then an IP and a receiver are bridged to the customer (action block 305). Then the system tests whether the customer is a dial pulse customer by checking whether any dial pulses have been received from that customer (test 315). If not, the switch passes along additional digits from the customer (action block 317). If the customer is a dial pulse customer, then the transceiver 2 forwards DTMF digits corresponding to dialed digits from the customer to the IP (action block 319). If a $\overline{\text{WINK}}$ is received from the trunk connected to the IP (test 320) then the receiver accepts characters, including digits and other characters such as * or #, from the IP (action block 321).

Call processing continues using the characters from the customer or from the IP as appropriate (action block 311). When it is discovered that dialing is complete, if the IP had been connected for this call, then this IP is disconnected (action block 313).

Another class of services which is not handled efficiently in a local digital switch, is that class of services which requires that a customer enter substantial quantities of data, in response to prompts. For example, if a customer is setting up an abbreviated dialing (speed calling) list, it is desirable to prompt the customer as the customer enters additional data. Such prompting arrangements and arrangements for absorbing large amounts of customer-dialed data are not handled efficiently in local switching systems. However, the prompting arrangements of the IP are well-suited to this task.

This arrangement can be used either universally on all calls, in order to detect spoken emergency commands immediately from any phone, or it can be arranged to provide premium service to customers who will pay for such service; in the latter case, only the premium service customers are initially connected to the intelligent peripheral. With the use of this intelligent peripheral, a number of services can be offered.

1. Each customer may be provided a small list of directory numbers corresponding to particular spoken phrases. The phrases may be recognized on a speaker-independent basis, in which case, the phrase spoken by any speaker will be recognized, or they may be provided on a speaker-dependent basis, in which case, information concerning speech signals are stored for a particular speaker.

2. The IP can be programmed to recognize spoken phrases to identify specific services, such as emergency services (e.g., "fire," "ambulance," "police"), with immediate connection to the appropriate service provider.

3. The IP can be programmed to guide a customer by prompts in order to set up call forwarding or automatic recording of a conversation in response to dialed or spoken information received by the IP.

4. The IP can be programmed to guide a customer by prompts to enter abbreviated dialing (speed calling) lists, in response to information dialed or spoken by the caller.

5. The IP can be programmed to recognize specific voices as a method of verifying the identity of an originating or incoming caller. The voice recognition can be used, for example, to insure that call forwarding is only initiated by a properly identified and authorized individual.

6. The IP can also be used for providing remote access to change a call forwarding number. The authorization for the remote access can be on the basis of a personal identification number or voice recognition.

7. Incoming call screening can be performed on the basis of an additional PIN, in order to make sure that calls are completed only from people properly authorized. This arrangement permits the equivalent of easy changing of an unlisted number, since the owner of the unlisted number can change the PIN at will, thereby making the number inaccessible to all who do not have the new PIN.

8. The IP can be used for queuing calls and giving the queued calls appropriate announcements to inform them of their status. The calls can be queued with or without a call waiting tone, and existing calls can be placed in the queue with an appropriate hold command.

The connection to the intelligent peripheral may be made in one of three ways. (1) It can be made for all calls (and this can be further broken down into all incoming calls, and/or all originating calls). (2) It can be made for calls originating from customers with a special class of service indication; for this case, the service can be invoked or turned off by the customer's dialing special invoke or revoke codes such as 1* and 1#. (3) It can be made for all calls identified by an appropriate preliminary set of digits. For example, all originating calls with an initial indication of one or more of *, #, **, or ## could automatically be routed to the intelligent peripheral for further dialing analysis. Similarly, all incoming calls to a directory number with final four digits 0000 (not normally used) could be routed to an IP.

It is to be understood that the above description is only one of preferred embodiment of the invention. Numerous other arrangements may be devised by one skilled in the art without departing from the scope of the invention. The invention is thus limited only as defined in the accompanying claims.

I claim:

1. A method of processing a telecommunications call comprising the steps of:
   responsive to receipt of a service request or an incoming call request from a calling station, connecting said calling station, in parallel, to a digit receiver of a switching system and to an intelligent peripheral means;
   testing in said intelligent peripheral means whether dialing information for completing said call is required from said intelligent peripheral means;
   responsive to a determination that dialing information is required from said intelligent peripheral means, supplying characters for said call from said intelligent peripheral means to said switching system for use in controlling establishment of said call; and
   responsive to a determination that no dialing information is required from said intelligent peripheral means, using dialing information supplied by said calling station to said digit receiver for controlling establishment of said call.

2. A method of processing a telecommunications call comprising the steps of:
   responsive to receipt of a service request or an incoming call request from a calling station, connecting said calling station, in parallel, to a digit receiver of a switching system and to an intelligent peripheral means;
   testing in said intelligent peripheral means whether dialing information for completing said call is required from said intelligent peripheral means; and
   responsive to a determination that dialing information is required from said intelligent peripheral means, supplying characters for said call from said intelligent peripheral means to said switching system for use in controlling establishment of said call;

wherein said intelligent peripheral means comprises speech recognition apparatus and wherein said testing comprises testing for the presence of key words.

3. The method of claim 1 further comprising the step of:
responsive to a determination that no dialing information is required from said intelligent peripheral means, disconnecting said intelligent peripheral means from said call.

4. The method of claim 1 wherein said supplying characters comprises the steps of:
receiving keyed characters from said calling station;
analyzing said received characters for deriving said characters; and
transmitting said characters to said digit receiver.

5. The method of claim 4 further comprising the step of prompting a caller at said calling station.

6. The method of claim 4 further comprising the step of receiving and interpreting spoken input from said calling station.

7. A method of processing a telecommunications call comprising the steps of:
responsive to receipt of a service request or an incoming call request from a calling station, connecting said calling station, in parallel, to a digit receiver of a switching system and to an intelligent peripheral means;
testing in said intelligent peripheral means whether dialing information for completing said call is required from said intelligent peripheral means; and
responsive to a determination that dialing information is required from said intelligent peripheral means, supplying characters for said call from said intelligent peripheral means to said switching system for use in controlling establishment of said call;
wherein said testing comprises detecting at least one keyed character for invoking use of said intelligent peripheral unit.

8. A method of processing a telecommunications call comprising the steps of:
responsive to receipt of a service request or an incoming call request from a calling station, connecting said calling station, in parallel, to a digit receiver of a switching system and to an intelligent peripheral means;
testing in said intelligent peripheral means whether dialing information for completing said call is required from said intelligent peripheral means; and
responsive to a determination that dialing information is required from said intelligent peripheral means, supplying characters for said call from said intelligent peripheral means to said switching system for use in controlling establishment of said call;
wherein said supplying step comprises the step of verifying authority of a caller at said calling station to make said call.

9. The method of claim 8 wherein said verifying comprises use of voice recognition for identifying an authorized caller.

10. The method of claim 8 wherein said verifying comprises verifying an identification number supplied by said caller.

11. The method of claim 1 further comprising the step of receiving dial pulse digits in said digit receiver; and transmitting tone digits corresponding to said dial pulse digits from said switching system to said intelligent peripheral means.

12. A method of processing a telecommunications call comprising the steps of:
responsive to receipt of a service request or an incoming call request from a calling station, connecting said calling station, in parallel, to a digit receiver of a switching system and to an intelligent peripheral means;
testing in said intelligent peripheral means whether dialing information for completing said call is required from said intelligent peripheral means; and
responsive to a determination that dialing information is required from said intelligent peripheral means, supplying characters for said call from said intelligent peripheral means to said switching system for use in controlling establishment of said call;
prior to performing said connecting step, receiving an invoking code from said calling station.

13. The method of claim 12 wherein said calling station has a class of service for receiving service from an intelligent peripheral unit.

14. The method of claim 1 wherein said calling station has a class of service for receiving service from an intelligent peripheral unit.

15. Apparatus for processing a telecommunications call comprising:
intelligent peripheral means, connected in parallel with a digit receiver, for receiving customer information from a calling station in response to a service request from said station;
said peripheral means operative under program control for detecting whether dialing information for completing a call is required from said intelligent peripheral means and responsive to a determination that dialing information is required from said intelligent peripheral means, supplying signals for establishing said call to a customer digit receiving means of a switching system connectable to said peripheral means for receiving customer digit information for said call;
said peripheral means further operative under program control and responsive to a determination that dialing information is not required from said intelligent peripheral means for not supplying said signals wherein said switching system completes said call using signals received from said customer in said digit receiving means.

16. Apparatus for processing a telecommunications call comprising:
intelligent peripheral means, connected in parallel with a digit receiver, for receiving customer information from a calling station in response to a service request from said station;
said peripheral means operative under program control for detecting whether dialing information for completing a call is required from said intelligent peripheral means and responsive to a determination that dialing information is required from said intelligent peripheral means, supplying signals for establishing said call to a customer digit receiving means of a switching system connectable to said peripheral means for receiving customer digit information for said call;
wherein said intelligent peripheral means comprises speech recognition apparatus and wherein said intelligent peripheral means is further operative under program control for detecting the presence of key words in said speech recognition apparatus for making said determination and for said supplying.

17. The apparatus of claim 15 wherein said intelligent peripheral means is further operative under program control for disconnecting said intelligent peripheral means from said call if said determination indicates that no dialing information is to be supplied from said intelligent peripheral means.

18. The apparatus of claim 15 wherein said intelligent peripheral means is further operative under program control for receiving keyed digits from said caller, analyzing said keyed digits for deriving said signals supplied to said customer dialing receiving means.

19. The apparatus of claim 18 wherein said intelligent peripheral means further comprises announcing means for prompting said caller.

20. The apparatus of claim 18 wherein said intelligent peripheral means further comprises speech recognition means for interpreting spoken input from said calling station for analyzing for deriving said signals.

21. Apparatus for processing a telecommunications call comprising:
    intelligent peripheral means, connected in parallel with a digit receiver, for receiving customer information from a calling station in response to a service request from said station;
    said peripheral means operative under program control for detecting whether dialing information for completing a call is required from said intelligent peripheral means and responsive to a determination that dialing information is required from said intelligent peripheral means, supplying signals for establishing said call to a customer digit receiving means of a switching system connectable to said peripheral means for receiving customer digit information for said call;
    wherein said intelligent peripheral means is further operative under program control for detecting at least one keyed character for determining that dialing information is required from said intelligent peripheral means for supplying said signals.

22. Apparatus for processing a telecommunications call comprising:
    intelligent peripheral means, connected in parallel with a digit receiver, for receiving customer information from a calling station in response to a service request from said station;
    said peripheral means operative under program control for detecting whether dialing information for completing a call is required from said intelligent peripheral means and responsive to a determination that dialing information is required from said intelligent peripheral means, supplying signals for establishing said call to a customer digit receiving means of a switching system connectable to said peripheral means for receiving customer digit information for said call;
    wherein said intelligent peripheral means is further operative under program control for verifying the authorization of a caller of said call to complete said call.

23. The apparatus of claim 22 wherein said intelligent peripheral means comprises means for voice recognition for identifying said caller, and wherein said verifying comprises identifying a voice of said caller.

24. The apparatus of claim 22 wherein said intelligent peripheral means is further operative under program control for verifying said authorization by verifying an identification number supplied by said caller.

25. Apparatus for processing a telecommunications call comprising:
    intelligent peripheral means, connected in parallel with a digit receiver, for receiving customer information from a calling station in response to a service request from said station;
    said peripheral means operative under program control for detecting whether dialing information for completing a call is required from said intelligent peripheral means and responsive to a determination that dialing information is required from said intelligent peripheral means, supplying signals for establishing said call to a customer digit receiving means of a switching system connectable to said peripheral means for receiving customer digit information for said call;
    wherein said digit receiving means is for receiving dial pulse digits wherein said switching system is connected to said peripheral means and comprises transmitting means for transmitting to said intelligent peripheral means tone signals corresponding to said dial pulse digits.

* * * * *